United States Patent [19]
Bell et al.

[11] Patent Number: 5,564,003
[45] Date of Patent: Oct. 8, 1996

[54] BATCH REGISTRATION OF OBJECT CLASSES

[75] Inventors: Laura K. Bell, Grand Prairie; Barbara McKee, Southlake; Thanh-Nha Nguyen; Keith A. Varga, both of Irving, all of Tex.

[73] Assignee: International Business Machines Corporation, Armonk, N.Y.

[21] Appl. No.: 356,830

[22] Filed: Dec. 15, 1994

Related U.S. Application Data

[63] Continuation of Ser. No. 862,703, Apr. 3, 1992, abandoned.
[51] Int. Cl.$^6$ .................................................. G06F 3/00
[52] U.S. Cl. ........................................ 395/155; 395/161
[58] Field of Search ................................. 395/157, 159, 395/161, 155

[56] References Cited

PUBLICATIONS

Microsoft Windows User's Guide (Trademark of Microsoft Corporation), 1990, pp. 81, 93, 138–140, 448, 458–473 and 561–563.
Microsoft Windows (Trademark of Microsoft Cor.) 1990, pp. 112–113.
Microsoft Windows User's Guide (Trademark of Microsoft Corporation), 1989, pp. 440–442 & 450.

*Primary Examiner*—Mark K. Zimmerman
*Assistant Examiner*—Cliff N. Vo
*Attorney, Agent, or Firm*—Edward H. Duffield; Duke W. Yee; Andrew J. Dillon

[57] ABSTRACT

A system for registering applications for use with a graphic user interface which includes providing registration information for the applications. The registration information includes class identifiers and templates. The templates identify object classes. Each of the class identifiers and each of the templates correspond to a particular application, and the system utilizes templates for registering applications and may utilize subprograms belonging to the graphic user interface to register applications. The system further includes initiating subprograms utilized while registering an object class, if the graphic user interface is inactive. The system registers the object classes and the registration information associated with the applications with the graphic user interface, such that the graphic user interface recognizes the object classes and the registration information associated with the applications, allowing the applications to be initiated through templates presented as icons in the graphic user interface. The system also includes automatically terminating the subprograms utilized while registering the object classes in response to completion of the registration.

13 Claims, 7 Drawing Sheets

BATCH REGISTRATION OF OBJECT CLASSES

This is a continuation, of application Ser. No. 07/862,703 filed Apr. 3, 1992, now abandoned.

BACKGROUND OF THE INVENTION

1. Technical Field

The present invention relates generally to an improved method and system for registering applications with a user interface and in particular, to an improved method and system for registering applications with a graphic user interface. Still more particularly the present invention provides an improved method and system for batch registration of applications with a graphic user interface.

2. Description of the Related Art

Presently, many graphic user interface platforms or primary applications exist which may be utilized to integrate other applications or programs with a graphic user interface. For example, Office Vision/2, a product of International Business Machines, Corporation, is a graphic user interface that may be utilized to organize, integrate, and operate applications and programs. New applications to be operated under Office Vision/2 and other graphic user interfaces, need to be registered with the graphic user interface (hereinafter "GUI") in order for the GUI to recognize the new applications. Presently, known GUI's offer a limited means for registering an application.

Utilizing known GUI's, a user may install new applications utilizing installation utilities provided with the applications. These installation programs typically alter files utilized by the GUI to let the GUI know that an application is present for utilization with the GUI. For example, utilizing a registration utility provided with a word processor application would allow the word processor application to be utilized with a GUI. In installing a new application, a user may be prompted to input various information such as the application's location, start up parameters, and default options. These registration utilities, however, are often inflexible and do not allow for the registration of additional information which a user may desire. In addition, these utilities often require input by the user in order to initialize the application for use with the GUI. Some installation utilities supplied with an application do not provide for registration to a GUI.

In such a case, the user must utilize a registration mechanism provided with the GUI in order for the GUI to recognize the application. Typically, the user must go through a number of steps to provide the necessary information about the application to the GUI. First, the user would activate the registration mechanism supplied with the GUI. Next, the user would be prompted to enter information needed by the GUI through a series of dialog boxes. For example, the user may be asked to supply information as to where the application is located, what icon is to be associated with application, what name is to be displayed in the GUI, and what parameters are to be associated with the application. Moreover, for any templates that might be utilized with the GUI, information must also be supplied to the GUI for each individual template. A template is utilized to create objects in a GUI.

A similar problem arises when the registration utility supplied with the application is not specifically tailored for registration of the application with a particular GUI that a user might wish to utilize. In such a case, where the application is not designed for implementation with a particular GUI, the user may still be able to register the new application with the GUI, utilizing the registration mechanism provided with the GUI. This approach, as described above, generally calls for continuous user input while the GUI is running, in order to register the application with the GUI. Furthermore, the registration process provided by GUI's are also limited in terms of what information may be registered with the GUI.

Additionally, an inconvenience arises when a manager of a data processing system, containing one or more networks of computers, wishes to register an application with a GUI on all or some of the computers connected together in the data processing system. The manager presently must physically register the new program with each GUI and must enter all the necessary data at each computer. This inconvenience increases when more than one new application needs to be registered with all the computers in the data processing system. Furthermore, as the number of computers present for registration increases and the number of applications to be registered increases, the probability that an error in data entry will occur also increases.

Therefore, it would be desirable to have a method and system for registering applications with a GUI that would permit registration of increased amounts of information and a reduction in the number of errors that may occur during the registration of one or more applications to one or more GUI's.

SUMMARY OF THE INVENTION

It is therefore one object of the present invention is to provide an improved method and system for registering applications.

It is another object of the present invention to provide an improved method and system for registering applications with a graphic user interface.

It is yet another object of the present invention to provide an improved method and system for the batch registration of multiple applications with a graphic user interface.

A method and system are disclosed for registering applications for use with a graphic user interface which includes the registration of information for use with the applications. The registration information includes class identifiers and templates which identify object classes. Each of the class identifiers and each of the templates corresponds to a particular application, and the method and system utilize the templates for registering applications and may utilize subprograms belonging to the graphic user interface to register applications. The method and system automatically initiates selected subprograms utilized while registering an object class, if the graphic user interface is inactive. The system registers the object classes and the registration information associated with the applications with the graphic user interface, such that the graphic user interface recognizes the object classes and the registration information associated with the applications, allowing the applications to be initiated through templates presented as icons in the graphic user interface. The system also includes automatically terminating any subprograms that may have been utilized while registering the object classes in response to completion of the registration.

Additional objects, features and advantages will be apparent in the written description which follows.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
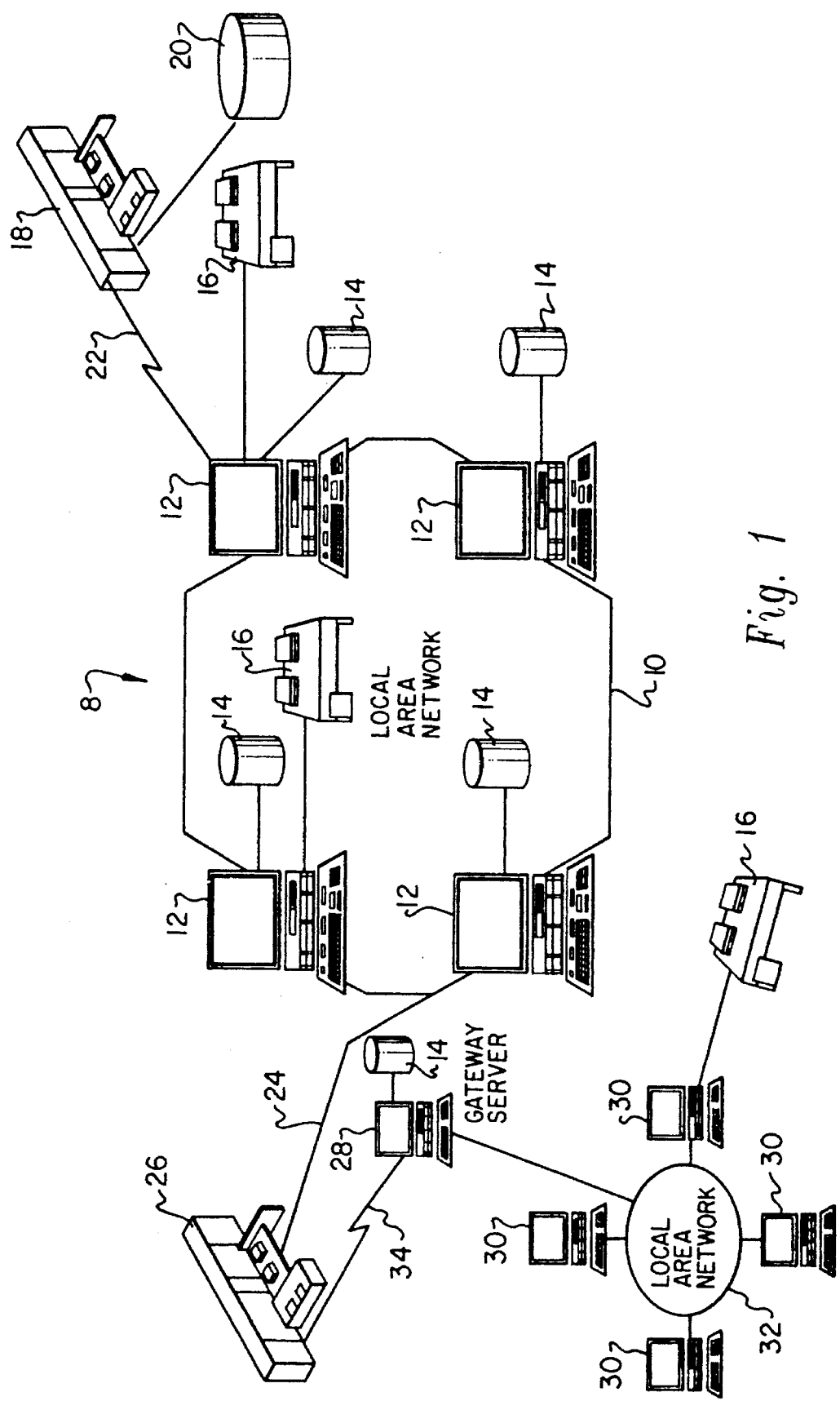
FIG. 1 depicts a pictorial representation of a data processing system which may be utilized to implement the method of the present invention.

With reference now to the figures, and in particular with reference to FIG. 1, there is depicted a pictorial representation of a data processing system 8 which may be utilized to implement a preferred embodiment of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 1, it may be seen that data processing network 8 may also include multiple mainframe computers, such as mainframe computer 18, which may be preferably coupled to Local Area Network (LAN) 10 by means of communications link 22. Mainframe computer 18 may also be coupled to a storage device 20 which may serve as remote storage for Local Area Network (LAN) 10. Similarly, Local Area Network (LAN) 10 may be coupled via communications link 24 through a subsystem control unit/communications controller 26 and communications link 34 to a gateway server 28. Gateway server 28 is preferably an individual computer or Interactive Work Station (IWS) which serves to link Local Area Network (LAN) 32 to Local Area Network (LAN) 10.

As discussed above with respect to Local Area Network (LAN) 32 and Local Area Network (LAN) 10, a plurality of documents or resource objects may be stored within storage device 20 and controlled by mainframe computer 18, as Resource Manager or Library Service for the resource objects thus stored. Of course, those skilled in the art will appreciate that mainframe computer 18 may be located a great geographic distance from Local Area Network (LAN) 10 and similarly Local Area Network (LAN) 10 may be located a substantial distance from Local Area Network (LAN) 32. For example, Local Area Network (LAN) 32 may be located in California while Local Area Network (LAN) 10 may be located within Texas and mainframe computer 18 may be located in New York.

A GUI may be found on individual computers 12 and 30, on gateway server 28, on some computer in LAN 10 or 32, or on mainframe computer 18. A preferred embodiment of the present invention may be utilized to register applications with a GUI located on a computer in data processing system 8.

Office Vision/2 is a GUI in which applications may be registered utilizing a preferred embodiment of the present invention. A New Icons Folder ("NIF") or New Object Folder ("NOF") is provided in Office Vision/2 as a container for templates. Templates are patterns utilized to create Office Vision/2 objects. Two basic types of templates exist, base class templates and derived templates. A base class template contains all the class information necessary to run an application. Consequently, if a base class template is deleted, the application can no longer be invoked by Office Vision/2. The class information includes, for example, class name, application path, working directory, and procedure entry point (if applicable), icon information, and application type.

A derived template is a template derived from a base class template. A derived template utilizes class information from the base class template to start the application associated with the template. Derived templates include, for example, template data file name, template property file name and template type.

Changes made to a base template also affects all templates associated with the base template, while modifications to a derived template only affects the modified template. Moreover, deleting a base class template will result in the derived templates being prevented from being invoked in Office Vision/2.

An application may be integrated into or participate in Office Vision/2 by being associated with an object class and registering the object class with Office Vision/2. This registration of the object class and other information may accomplished by utilizing a preferred embodiment of the method and system of present invention.

Figure 2:
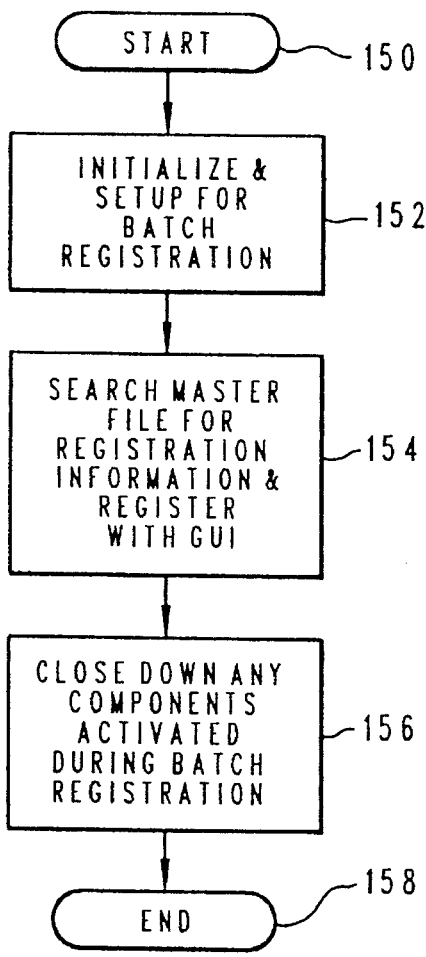
FIG. 2 is a high level flowchart of a system utilized in the batch registration of applications with a GUI in accordance with a preferred embodiment of the present application.

The procedure illustrated in FIG. 2 may be utilized to register one or more applications with a GUI. Referring now to FIG. 2, there is depicted a high level flowchart of a system utilized in the batch registration of applications with a GUI in accordance with a preferred embodiment of the present application. The process begins as illustrated in block 150, and thereafter proceeds to block 152, which illustrates initializing and setting up the necessary files and parameters for batch registration. Block 152 may include initializing subprograms belonging to the GUI that are necessary in registering an application to the GUI. For example, in Office Vision/2, a subprogram is needed to write to ".INI" files during the registration process, and the subprogram for the transcript window in Office Vision/2 may also be utilized during registration. The ".INI" file contains information on applications registered to the GUI. Next, the process proceeds to block 154, which illustrates searching or parsing the master file for keywords and registering the information with the GUI. Thereafter, the process proceeds to block 156, which shows closing down or terminating any subprograms of the GUI that may have been activated during the batch registration process. Subsequently, the process terminates in block 158.

Figure 3:
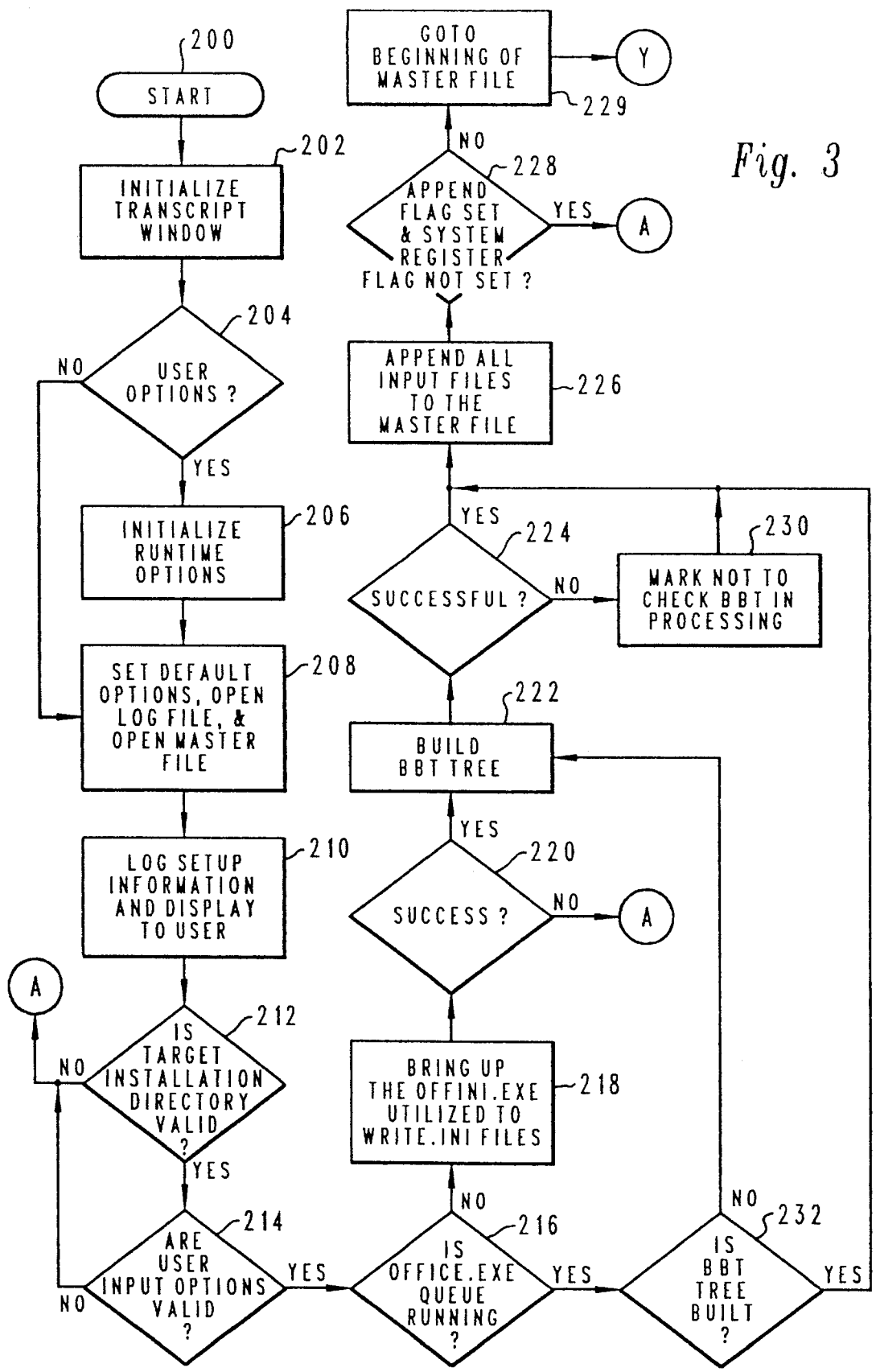
FIG. 3 depicts a flowchart of the process utilized to initialize and set up for batch registration in accordance with a preferred embodiment of the present invention.

With reference to FIG. 3, there is depicted a flowchart of the process utilized to initialize and set up for batch registration. The process begins in block 200 and thereafter proceeds to block 202, which illustrates initializing the transcript window. The "transcript window" is a window opened on a video display terminal to display information to the user during the registration process, such as, for example, the status of the registration process or what application is being registered.

The process thereafter proceeds to block 204, which shows a determination of whether user options exist. If user options exist, the process then proceeds to block 206, which illustrates the initialization of the runtime options specified. User options are options for various settings in the registration program that may be set by a user. User options include, for example, the path of the master file, the name of the master file, the name of the log file, and whether to set an append flag. Next, the process proceeds to block 208, which shows setting default options, opening the log file, and opening the master file. Default options are set for options not set by the user. The "log file" is a file for saving setup information for applications that are registered, and the "master file" is a file in which information necessary for registering the application is placed for use during the registration process, for example, keywords and parameters. In accordance with a preferred embodiment of the present invention, the registration information found in the input files are keyword entries in the form of a "keyword"= "value" or a keyword pair format.

Referring back to block 204, if user options are not present, the process then proceeds to block 208, showing the setting of default options, the opening of the log file, and the opening of the master file. Next, the process proceeds to block 210, which illustrates logging or saving the setup information to the log file and displaying the information to the user on the transcript window.

Next, block 212 shows a determination of whether the target installation directory is valid. If the target installation directory is not valid, the process then proceeds to block 350 in FIG. 8 through connector A. If the target installation directory is valid, the process then proceeds to block 214, which illustrates a determination of whether input options are valid. If user input options are not valid, the process then proceeds to block 350 in FIG. 8 through connector A.

Referring again to block 214, if user options are valid, the process then proceeds to block 216, which shows a determination of whether OFFINI.EXE queue is running. "OFFINI.EXE queue" is utilized to write to ".INI" files in accordance with a preferred embodiment of the present invention. If OFFINI.EXE queue is not running, the process then proceeds to block 218, which illustrates bringing up or initiating the OFFINI.EXE. Next, block 220 shows a determination of whether the attempt to initiate the OFFINI.EXE was successful. If the OFFINI.EXE was successfully initiated, the process then proceeds to block 222, which illustrates building a balance binary tree "BBT") tree in the memory. In accordance with a preferred embodiment of the present invention, the BBT tree contains the information found in the ".INI" file. The BBT tree is utilized to speed up the registration process. Information is saved to the BBT tree during registration and is later stored in the ".INI" file after registration is completed. The BBT tree will be utilized in place of the ".INI" file to register the applications.

The process then proceeds to block 224, which shows a determination of whether the BBT tree was successfully built. If the BBT tree was successfully built, the process proceeds to block 226, which illustrates appending all of the input files to the master file. The "input files" are individual files containing registration information for various applications. For example, if a user desires to register four applications, the information for registration of each application may be placed in individual input files for each application or in one input file for all the applications. These input files are appended together into the master file during initiation and set up for registration.

Next, block 228 shows a determination of whether the append flag is set and the system register flag is not set. These flags may be set through user options as described above. If both the append flag is set and the system register flag is not set, the process then proceeds to block 350 in FIG. 8 through connector A. Otherwise, the process then proceeds to block 229, which illustrates setting a pointer to the beginning of the master file. Thereafter the process continues to block 234 in FIG. 4 through connector Y.

Referring back to block 224, if the BBT tree was not successfully built, the process then proceeds to block 230, which illustrates marking not to check the BBT tree in processing of the master file during the rest of the registration process. Thereafter the process proceeds to block 226, which illustrates appending all of the input files to the master file. Next, block 228 shows a determination of whether both the append flag has been set and the system register flag is not set. If both the append flag has been set and the system register flag has not been set, the process then proceeds to block 350 in FIG. 8 through connector A. Otherwise, the process then proceeds to block 229, which illustrates setting a pointer to the beginning of the master file. Thereafter the process continues to block 234 in FIG. 4 through connector Y.

Referring to back to block 216, if OFFINI.EXE queue is running, the process proceeds to block 232, which illustrates a determination of whether a BBT tree has been built. If a BBT tree has been built, the process then proceeds to block 226, which illustrates appending all of the input files to the master file. Afterwards the process then proceeds to block 228, which shows the determination of whether both the append flag has been set and the system register flag has not been set. Again as previously described, if both the append flag has been set and the system register flag has not been set, the process then proceeds to block 350 in FIG. 8 through connector A. Otherwise, the process then proceeds to block 229, which illustrates setting a pointer to the beginning of the master file. Thereafter the process continues to block 234 in FIG. 4 through connector Y.

Referring back to block 232, if a BBT tree has not been built, the process proceeds to block 222, which illustrates building a BBT tree. Then, the process proceeds to block 224, which shows a determination of whether the BBT tree was successfully built. If the BBT tree was successfully built, the process proceeds to block 226, which illustrates appending all input files to the master file. Next, the process proceeds to block 228, which shows a determination of whether both the append flag has been set and the system register flag has not been set. As described above, the process continues to through connector A to block 350 if both the append flag is set and the system register flag is not set. Otherwise, the process then proceeds to block 229, which illustrates setting a pointer to the beginning of the master file. Thereafter the process continues to block 234 in FIG. 4 through connector Y.

Figure 4:
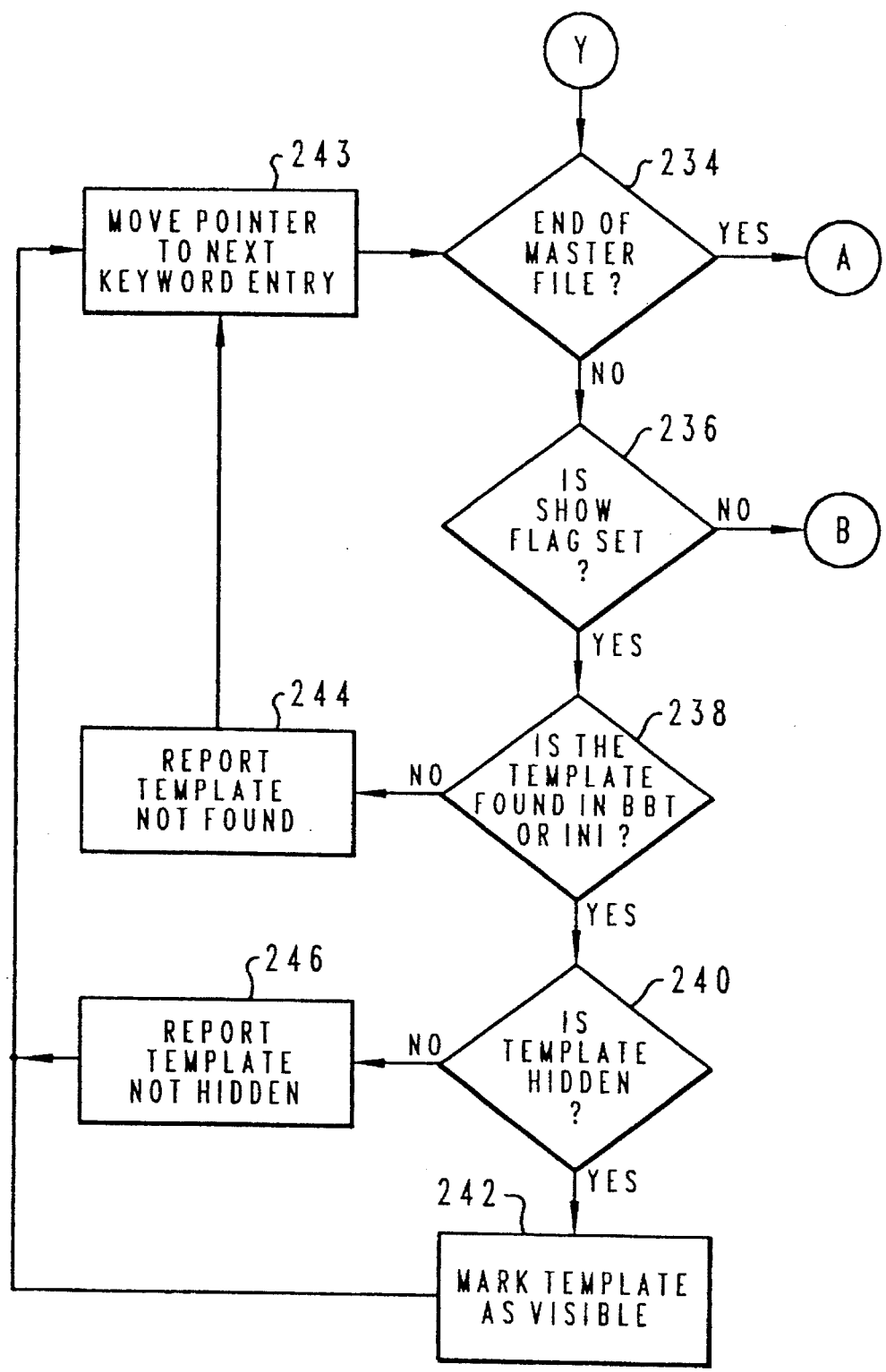
FIG. 4 is a flowchart depicting a portion of a method for parsing the master file for information needed for registering an application with a GUI in accordance with a preferred embodiment of the present invention.
Figure 5:
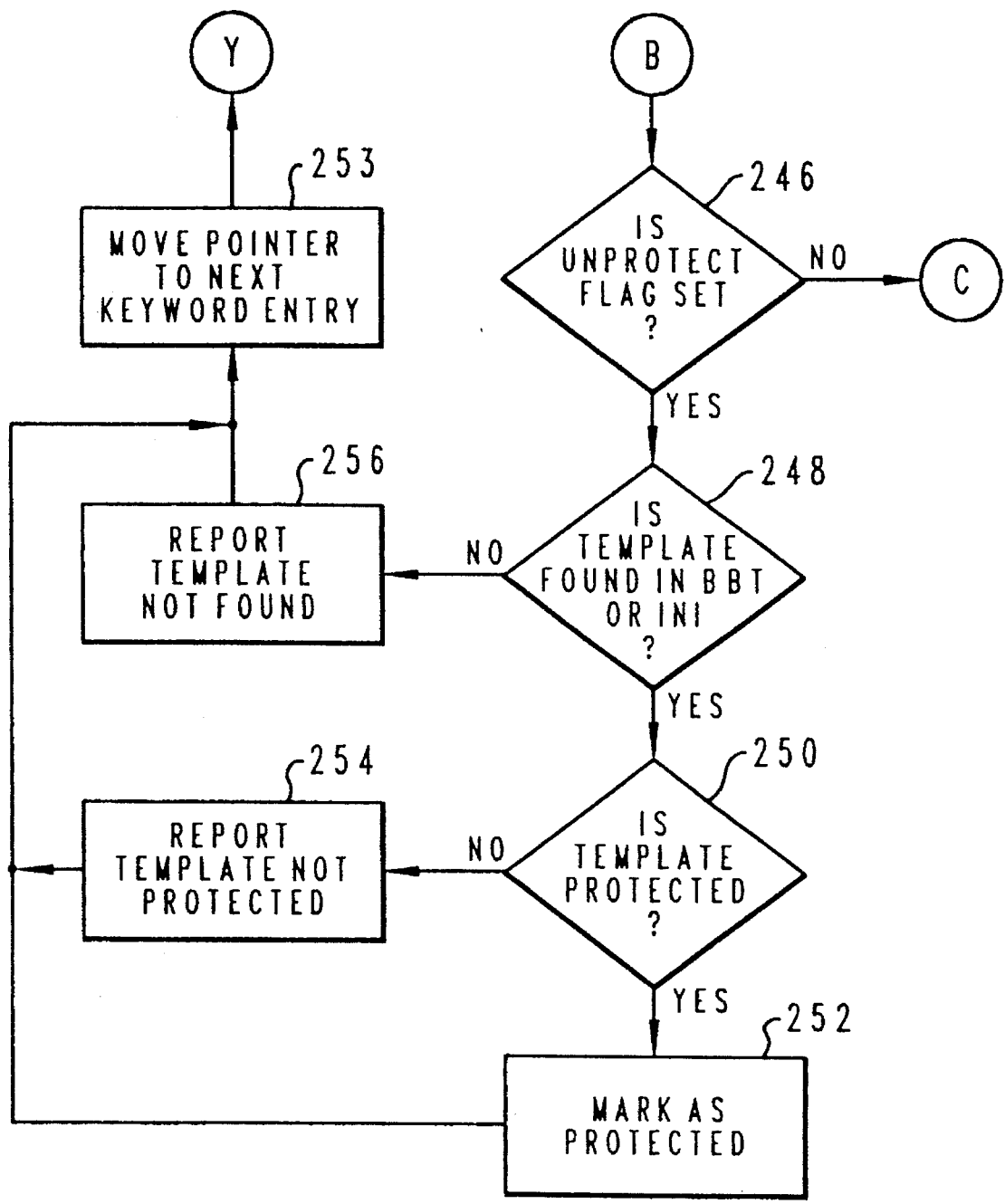
FIG. 5 depicts a flowchart depicting a portion of a method for parsing the master file for information needed for registering an application with a GUI in accordance with a preferred embodiment of the present invention.
Figure 6:
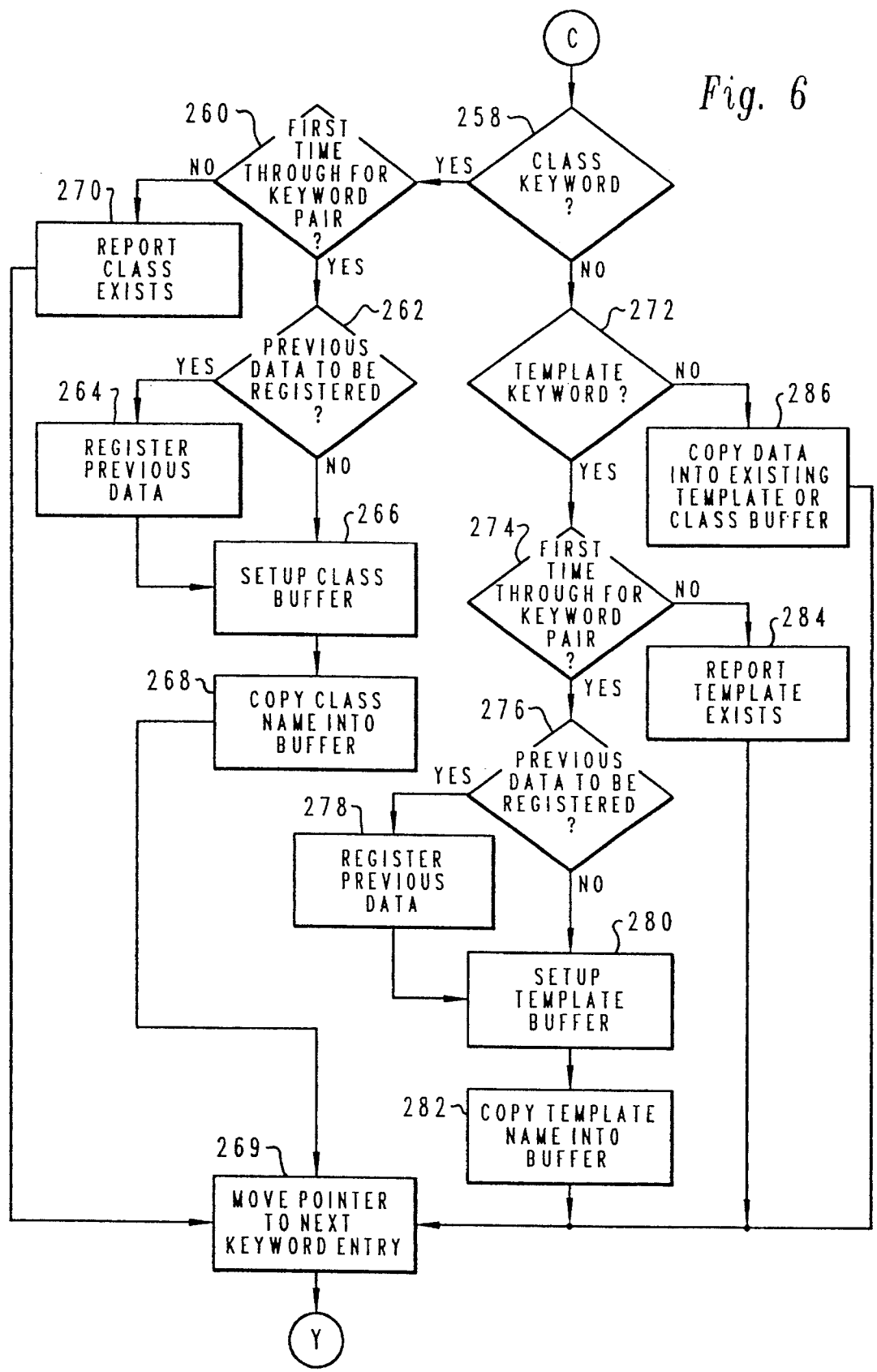
FIG. 6 is a flowchart depicting a portion of a method for parsing the master file for information needed for registering an application with a GUI in accordance with a preferred embodiment of the present invention.

Referring to FIGS. 4, 5, and 6 there are depicted flowcharts of a method for parsing the master file for the information needed for registering an application with a GUI in accordance with a preferred embodiment of the present invention. Referring now to FIG. 4, there is depicted a flowchart depicting a portion of a method for parsing the master file for information needed for registering an application with a GUI in accordance with a preferred embodiment of the present invention.

Next, block 234 illustrates a determination of whether the end of file has been reached in the master file. If the end of the master file has not been reached, the process then proceeds to block 236, which shows a determination of whether the show flag has been set. The show flag is utilized to determine whether the template will be visible. In other words, the show flag determines whether the template will be represented by an icon in the GUI. In this manner, various templates may be registered during the initial registration that a software vendor or provider may not wish a user to have access to until a later time or until a user desires to purchase a particular option. Thus, if a user desired to add an additional option represented by a template, the template could be made visible to the user without having to install.

If the show flag has been set, the process then proceeds to block 238, which illustrates a determination of whether the template is found in the BBT tree or the ".INI" file. If the template is found in either the BBT tree or the ".INI" file, the process then proceeds to block 240, which shows a determination of whether the template is hidden. If the template is hidden, the process proceeds to block 242, which illustrates marking the template as visible. Next, the process proceeds to block 243, which shows moving the pointer to the next keyword entry in the master file. Thereafter, the process returns to block 234 for a determination of whether the end of the master file has been reached. If the end of the master file has been reached, the process then continues to block 350 through connector A in FIG. 8.

Now referring to block 238, if the template is not found in either the BBT tree or the ".INI" file, the process then proceeds to block 244, which shows reporting the template as not found. Next, the process proceeds to block 243, which shows moving the pointer to the next keyword entry in the master file. The process then proceeds to block 234 for a determination of whether the end of the master file has been reached.

Referring to block 240, if the template is not hidden, the process proceeds to block 246 which illustrates reporting that the template is not hidden. Next, the process proceeds to block 243, which shows moving the pointer to the next keyword entry in the master file. Thereafter, the process returns to block 234, which illustrates a determination of whether the end of the master file has been reached. Referring back to block 236, if the show flag has not been set, the process then proceeds to block 246 in FIG. 5 through connector B.

Templates registered with Office Vision/2 under a system in accordance with a preferred embodiment of the present invention may be specified to remain "hidden"; i.e., no icon will be shown in the new NIF for that template. Hidden templates are desirable for templates that do not need to be represented by an icon in the new NIF, but which must be registered with Office Vision/2 so that their applications can be started by Office Vision/2.

With reference to FIG. 5, there is depicted a flowchart depicting a portion of a method for parsing the master file for information needed for registering an application with a GUI in accordance with a preferred embodiment of the present invention. Block 246 shows a determination of whether the unprotect flag has been set. If the unprotect flag has been set, the process then proceeds to block 248, which illustrates a determination of whether the template is found in the BBT tree or the ".INI" file. If the template is found in the BBT tree or the ".INI" file, the process then proceeds to block 250, which shows a determination of whether the template is protected. Protected templates may not be deleted by a user. This portion of the process will protect and unprotect templates as specified in the input files appended to the master file. If the template is protected, the process then proceeds to block 252 which illustrates marking the template as unprotected. Next, the process proceeds to block 253, which shows moving the pointer to the next keyword entry in the master file. The process then proceeds to block 234 back in FIG. 4 via connector Y.

Referring back to block 250, if the template is not protected, the process then proceeds to block 254, which shows reporting that the template is not protected. Next, the process proceeds to block 253, which shows moving the pointer to the next keyword entry in the master file. The process then proceeds to block 234 in FIG. 4 through connector Y.

Next, referring back to block 248, if the template is not found in the BBT tree or the ".INI" file, the process proceeds to block 256, which illustrates reporting that the template has not been found. Next, the process proceeds to block 253, which shows moving the pointer to the next keyword entry in the master file. Thereafter, the process then proceeds to block 234 back in FIG. 4 through connector Y. Now referring back to block 246, if the unprotected flag has not been set, the process then proceeds to block 258 in FIG. 6 through connector C.

A protected bit or flag may be set for templates, which will not allow a user to remove the template from the new icons folder, NIF. This protected bit may be reset to an unprotected status when required by running the system of the present invention with a parameter of unprotect. Once a template's protected bit has been reset to an unprotected status, the template may be removed from the NIF organizer. Thus, if a template is incorrectly registered a system administrator may delete the single incorrectly registered template by unprotecting the template and re-registering the template correctly. Templates may be protected by setting a protected bit or flag in order to prevent end users from deleting templates that are necessary for running the application, such as the base template, or preventing end users from deleting templates that are set up as forms.

Referring to FIG. 6, there is depicted a flowchart depicting a portion of a method for parsing the master file for information needed for registering an application with a GUI in accordance with a preferred embodiment of the present invention. Block 258 shows a determination of whether the keyword pair contains a class keyword. If the keyword pair contains a class keyword, the process proceeds to block 260, which illustrates a determination of whether it is the first time through for the keyword pair. If it is the first time for the keyword pair the process then proceeds to block 262, which shows a determination of whether previous data exists to be registered. If previous data exists to be registered, the process then proceeds to block 264, which illustrates registering the previous data. Thereafter, the process proceeds to block 266, which shows setting up a class buffer. Next, the process proceeds to block 268, which illustrates copying the class name into the class buffer. Block 269 shows moving the pointer to the next keyword entry in the master file. Thereafter the process returns to block 234 the connector Y.

Referring back to block 262, if previous data does not exist to be registered, the process proceeds directly to block 266, which shows setting up the class buffer. Thereafter, the process proceeds to block 268, which illustrates copying the class name into the class buffer. Block 269 shows moving the pointer to the next keyword entry in the master file. Afterwards, the process proceeds to block 228 in FIG. 3 through connector Y.

Referring back to block 260, if it is not the first time through for the keyword pair, the process then proceeds to block 270, which shows reporting that the class exists. Block 269 shows moving the pointer to the next entry in the master file. Afterwards, the process proceeds to block 228 in FIG. 3 through connector Y.

Referring back to block 258, if the keyword is not a class keyword, the process proceeds to block 272, which illustrates a determination of whether the keyword is a template keyword. If the keyword is a template keyword, the process proceeds to block 274, which shows a determination of whether it is the first time through for the keyword pair. If it is the first time through for the keyword pair, the process then proceeds to block 276, which illustrates a determination of whether previous data exists to be registered. If previous date exists to be registered, the process then proceeds to block 278, which shows registering the previous data. Thereafter, the process proceeds to block 280, which illustrates setting up a template buffer. Next, the process proceeds to block 282, which illustrates copying the template name into the template buffer. Block 269 shows moving the pointer to the next keyword entry in the master file. Thereafter, the process proceeds to block 228 in FIG. 3 via connector Y.

Referring back to block 276, if previous data does not exist to be registered, the process proceeds directly to block 280, which shows setting up a template buffer. Thereafter, the process proceeds to block 282, which illustrates copying the template name into the template buffer. Block 269 shows moving the pointer to the next entry in the master file. Afterwards, the process thereafter proceeds to block 228 in FIG. 3 through connector Y.

Referring back to block 274, if it is not the first time through for the keyword pair, the process then proceeds to block 284, which shows reporting that the template exists. Block 269 shows moving the pointer to the next entry in the master file. Afterwards, the process proceeds to block 228 in FIG. 3 through connector Y.

Referring back to block 272, if the keyword is not a template keyword, the process proceeds to block 286, which shows copying data into an existing template or class buffer. Block 269 shows moving the pointer to the next entry in the master file. Afterwards, the process returns to block 228 in FIG. 3 through connector Y.

Figure 7:
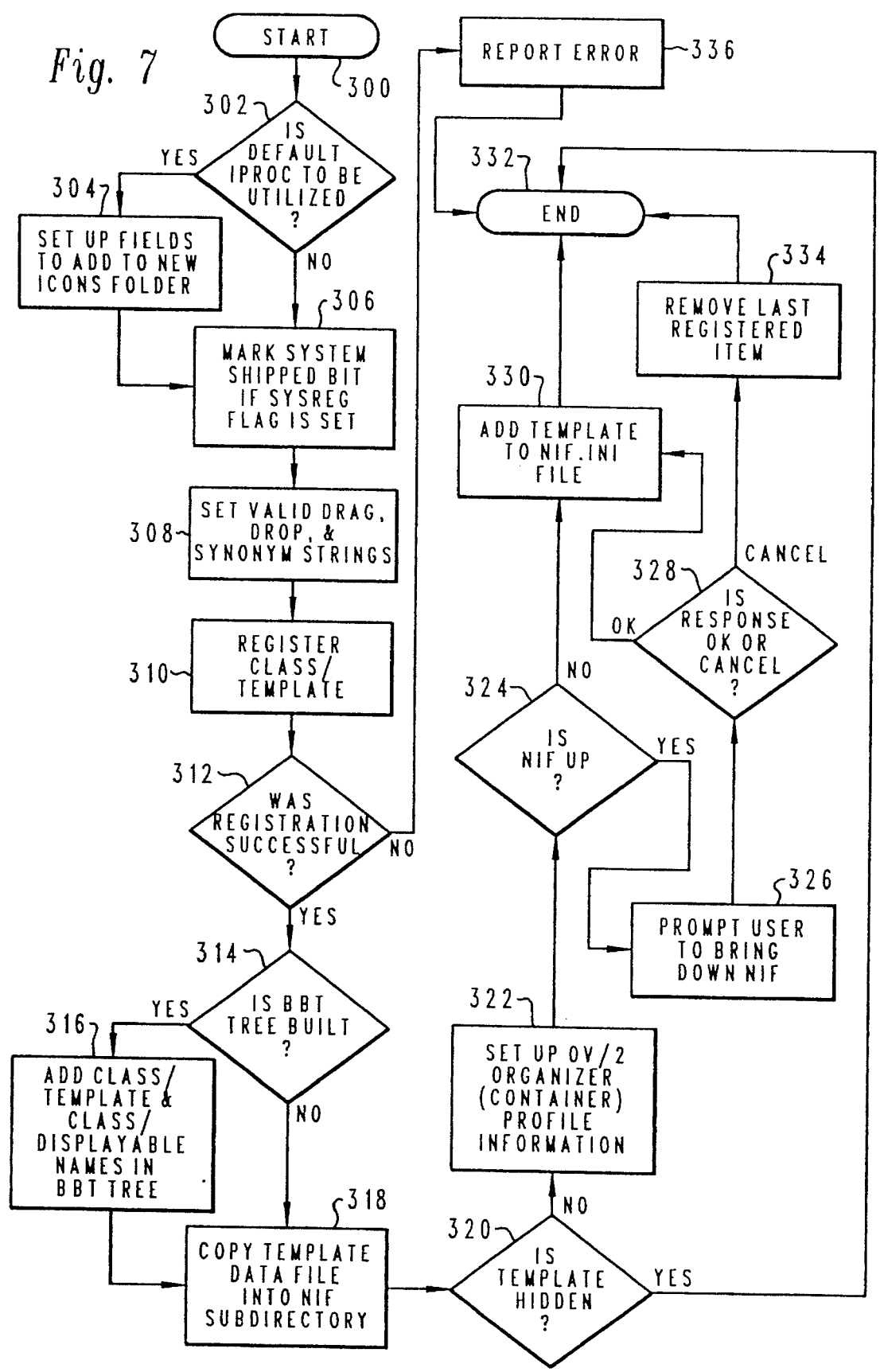
FIG. 7 depicts a detailed flowchart of the registration process followed in blocks 264 and 278 in FIG. 6.

With reference to FIG. 7, there is depicted a detailed flowchart of the registration process followed in blocks 264 and 278 in FIG. 6. As illustrated, the process begins in block 300 and thereafter proceeds to block 302, which illustrates a determination of whether a default IPROC is to be utilized. "IPROC" is the icon procedure code, which is a code associated with an icon that enables the icon to be shown in the GUI. IPROC, for example, includes code for drag operations, drop operations, and default message handling for the icon. If IPROC is to be utilized, the process proceeds to block 304 which shows setting up fields to add to new icons folder. Thereafter, the process proceeds to block 306 which illustrates marking the system shipped bit if SYSREG flag is set.

If a default IPROC is not to be utilized, the process proceeds directly to block 306 as described above. Afterwards, the process proceeds to block 308, which shows setting valid drag, drop, and synonym strings for the application. The process then proceeds to block 310, which illustrates registering the class/template. Next, block 312 shows a determination of whether the registration was successful. If the registration was successful, the process then proceeds to block 314, which illustrates a determination of whether BBT tree was built. If a BBT tree was built, the process then proceeds to block 316, which shows adding class/template and class/displayable names in BBT tree. Afterwards, the process proceeds to block 318, which illustrates copying template date file into the NIF subdirectory. Referring back to block 314, if a BBT tree was not built, the process proceeds directly to block 318, bypassing block 316.

Next, block 320 shows a determination of whether the template is hidden. If the template is not hidden, the process proceeds to block 322, which illustrates setting up Office Vision/2 organizer (container) profile information for the application. Thereafter, the process proceeds to block 324, which shows a determination of whether NIF is up. If NIF is up, the process proceeds to block 326, which illustrates, prompting the user to bring down or close the NIF. Thereafter, the process proceeds to block 328, which shows a determination of whether the response is "OK" or "CANCEL". If the response is "OK", the process then proceeds to block 330 which illustrates adding the template to the NIF.INI file. Thereafter, the registration process terminates in block 332.

Referring back to block 328, if the response is "CANCEL", the process then proceeds to block 334, which illustrates removing the last registered item. Thereafter, the process again terminates in block 332.

Now, referring back to block 324, if the NIF is not up, the process proceeds directly to block 330, which illustrates adding the template to NIF.INI file. Thereafter, the process terminates in block 332. Referring back to block 320 if the template is hidden the process terminates in block 332.

Referring back to block 312, if the registration process was not successful, the process then proceeds to block 336, which shows reporting a error. Thereafter, the process terminates in block 332.

Figure 8:
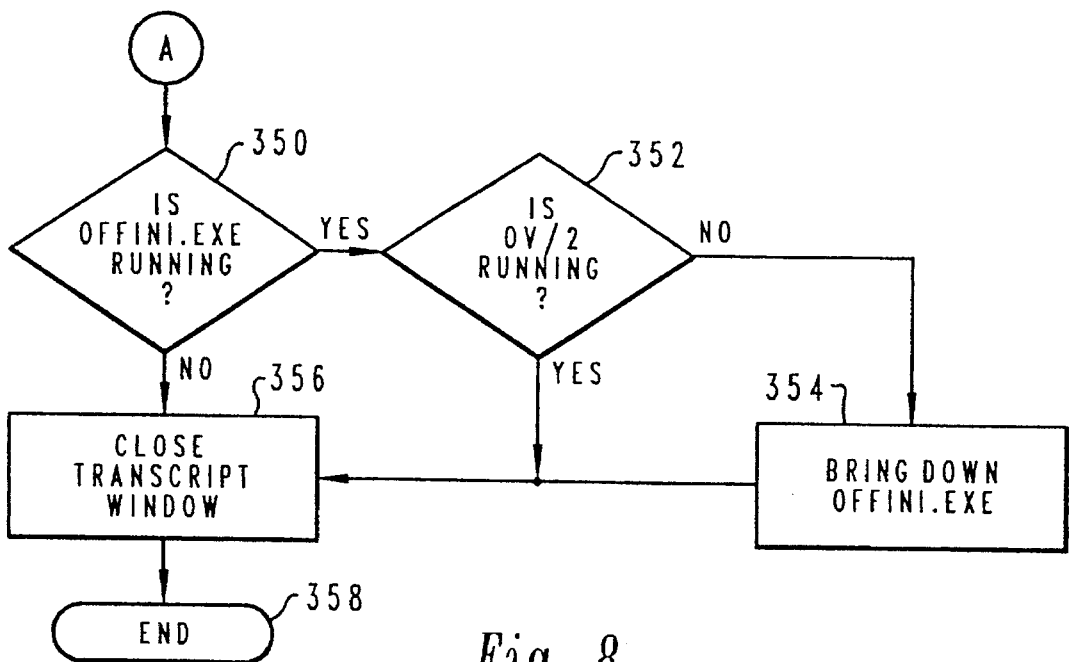
FIG. 8 is a flowchart of a exit routine in accordance with a preferred embodiment of the present invention.

Blocks 214, 220, 228, and 234 may proceed to block 350 through connector A. Referring to FIG. 8, there is depicted a flowchart of an exit routine in accordance with a preferred embodiment of the present invention. Block 350 illustrates a determination of whether OFFINI.EXE is running. If OFFINI.EXE is running, the process then proceeds to block 352, which shows a determination of whether Office Vision/2 is running. If Office Vision/2 is not running, the process then proceeds to block 354, which illustrates terminating OFFINI.EXE. Thereafter, the process proceeds to block 356, which shows closing the transcript window. The process terminates in block 358.

Referring back to block 352, if Office Vision/2 is running, the process then proceeds to block 356, which shows closing the transcript window and the process thereafter terminates in block 358. Referring back to block 350 if OFFINI.EXE is not running, the process proceeds directly to block 356, which shows closing the transcript window. Thereafter, the process terminates in block 358.

One advantage of the present invention is that the registration of programs does not require the GUI to be active during installation. Moreover, application unique information can be provided through keywords that are not otherwise supported through registering the application utilizing the mechanism provided by the GUI or the application. In accordance with the present invention, more detailed and complex options may be utilized in this registration system than in on-line registration systems. Moreover, isolating registration information into files allows for simple and speedy duplication at other data processing systems, thus minimizing the errors associated with manual on-line duplication of entering registration information.

While the invention has been particularly shown and described with reference to a preferred embodiment, it will be understood by those skilled in the art that various changes in form and detail may be made therein without departing from the spirit and scope of the invention.

What is claimed is:

1. A method in a data processing system for registering a plurality of applications for use with a graphic user interface, said graphic user interface utilizing templates, said method comprising:

providing registration information for said plurality of applications, said registration information including a plurality of class identifiers and a plurality of templates, said plurality of class identifiers identifying a plurality of object classes, each of said plurality of class identifiers and each of said plurality of templates corresponding to a particular one of said plurality of applications; and registering said plurality of object classes and said registration information being associated with said plurality of applications with said graphic user interface, such that said graphic user interface recognizes said plurality of object classes and said registration information associated with said plurality of applications, allowing said plurality of applications to be initiated through templates presented as icons in said graphic user interface.

2. The method of claim 1 wherein said graphic user interface includes at least one subprogram utilized while registering said plurality of applications, said method further comprising:

initiating said at least one subprogram utilized while registering an object class, if said graphic user interface is inactive; and automatically terminating said at least one subprogram utilized while registering said plurality of object classes in response to completion of said registering.

3. The method of claim 2 wherein said registration information is located in a file.

4. The method of claim 3 further comprising creating a log, said log including information on successful registration attempts and unsuccessful registration attempts.

5. The method of claim 4, wherein said successful registration attempts and said unsuccessful registration attempts are presented to a user on a video display during the process of registering said plurality of applications to said graphic user interface.

6. A system for registering a plurality of applications for use with a graphic user interface, said graphic user interface utilizing templates, said system comprising:

means for providing registration information for said plurality of applications, said registration information including a plurality of class identifiers and a plurality of templates, said plurality of class identifiers identifying a plurality of object classes, each of said plurality of class identifiers and each of said plurality of templates corresponding to a particular one of said plurality of applications;

means for creating a data structure in memory to store said registration information during registration of said plurality of applications;

means for registering said plurality of object classes using said data structure and said registration information being associated with said plurality of applications with said graphic user interface, such that said graphic user interface recognizes said plurality of object classes and said registration information associated with said plurality of applications, allowing said plurality of applications to be initiated through templates presented as icons in said graphic user interface; and means for storing said registration information in said data structure to at least one file used by said graphic user interface to recognize an application after said plurality of object classes have been registered.

7. The system of claim 6, wherein said graphic user interface includes at least one subprogram utilized while registering said plurality of applications, said system further comprising:

means for initiating said at least one subprogram utilized while registering an object class, if said graphic user interface is inactive; and means for automatically terminating said at least one subprogram utilized while registering said plurality of object classes in response to completion of said registering.

8. The system of claim 7, wherein said registration information is located in a file.

9. The system of claim 7, further comprising means for creating a log, said log including information on successful registration attempts and unsuccessful registration attempts.

10. The system of claim 9, wherein said successful registration attempts and said unsuccessful registration attempts are presented to a user on a video display during the process of registering said plurality of applications to said graphic user interface.

11. A data processing system for registering a plurality of applications for use with a graphic user interface comprising:

a file containing registration information which includes a plurality of class identifiers and a plurality of templates, said plurality of class identifiers and a plurality of templates, said plurality of class identifiers identifying a plurality of object classes, each of said plurality of class identifiers and each of said plurality of templates corresponding to a particular one of said plurality of applications;

registration means for automatically registering said plurality of applications with said application using said registration information stored in said file; and automatic storage means for storing said registration information located in said file in at least one other file used by said graphic user interface to recognize applications, such that said graphic user interface recognizes said plurality of object classes and said registration information associated with said plurality of applications, allowing said plurality of applications to be initiated through templates presented as icons in said graphical user interface.

12. The data processing system of claim 11, wherein said graphic user interface includes at least one subprogram used while registering said plurality of applications, said data processing system further comprising:

initiation means for initiating said at least one subprogram utilized while registering an application, if said graphic user interface is inactive; and termination means for automatically terminating said at least one subprogram utilized while registering said plurality of objects in response to a completion of a registration of said plurality of applications.

13. The data processing system of claim 11, wherein said registration information for each application in said plurality of applications is found in a file and further comprising transfer means for storing registration information from each file into said data structure located in said memory.

\* \* \* \* \*